(No Model.) 5 Sheets—Sheet 1.

F. D. FRY.

MACHINE FOR PRESSING THE BRIMS AND SHAPING THE CROWNS OF HATS.

No. 465,129. Patented Dec. 15, 1891.

WITNESSES:
H. Finch.
S. S. Williamson.

INVENTOR
F. D. Fry
BY F. W. Smith Jr.
ATTORNEY (No Model.) 5 Sheets—Sheet 2.
F. D. FRY.
MACHINE FOR PRESSING THE BRIMS AND SHAPING THE CROWNS OF HATS.
No. 465,129. Patented Dec. 15, 1891.

(No Model.) 5 Sheets—Sheet 3.
F. D. FRY.
MACHINE FOR PRESSING THE BRIMS AND SHAPING THE CROWNS OF HATS.
No. 465,129. Patented Dec. 15, 1891.
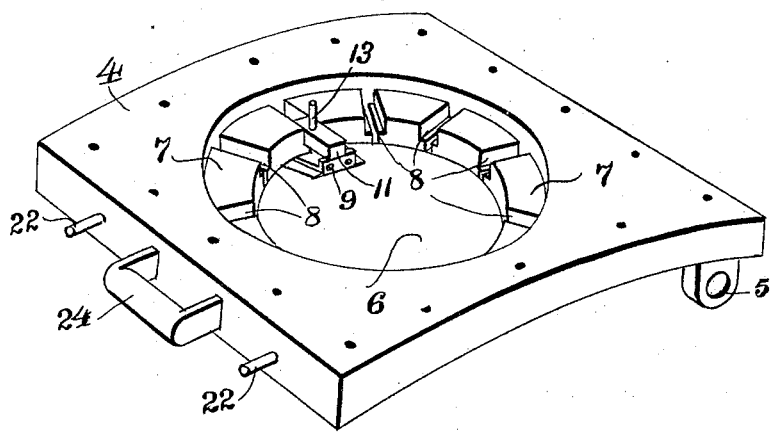
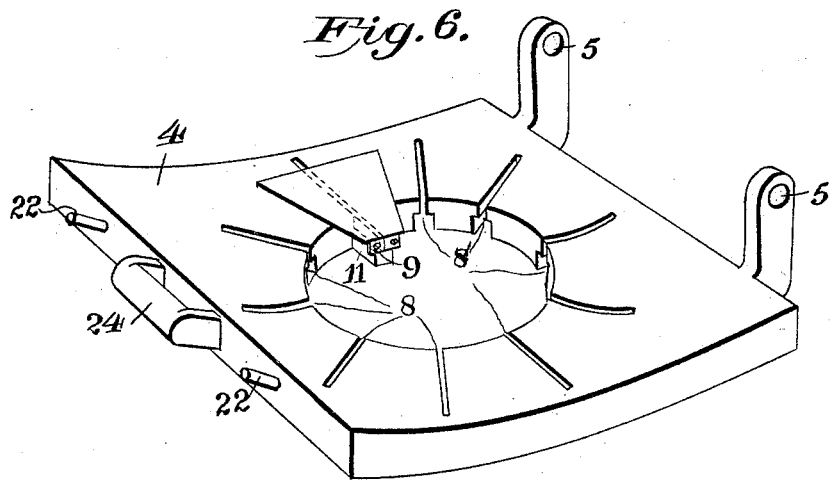
WITNESSES:
INVENTOR
F. D. Fry
BY
ATTORNEY (No Model.)
F. D. FRY.
MACHINE FOR PRESSING THE BRIMS AND SHAPING THE CROWNS OF HATS.
No. 465,129. Patented Dec. 15, 1891.
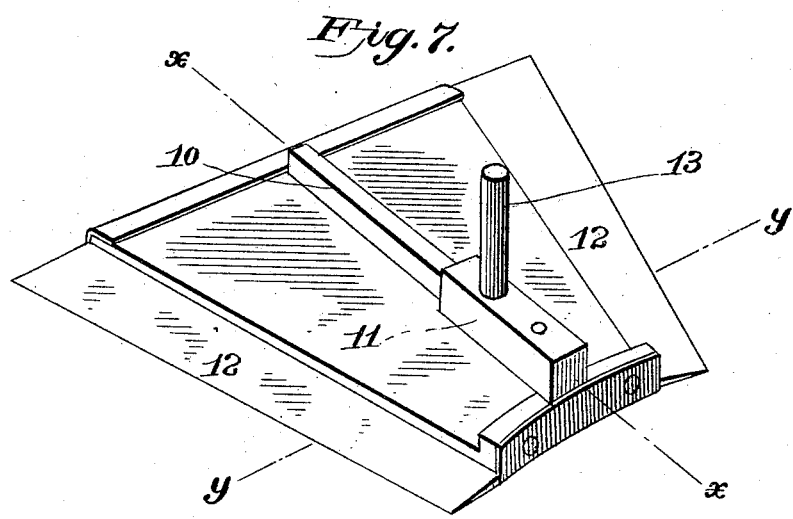
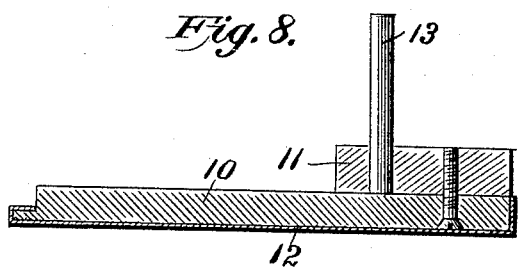
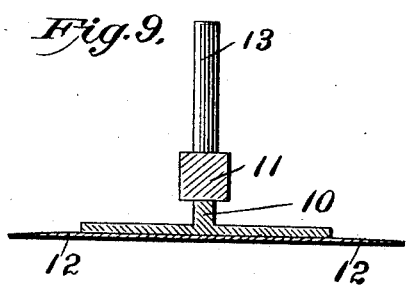
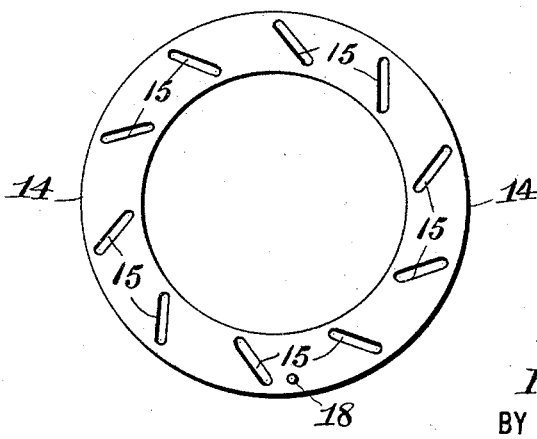
WITNESSES:
INVENTOR
F. D. Fry
BY
ATTORNEY (No Model.)  5 Sheets—Sheet 5.

F. D. FRY.
MACHINE FOR PRESSING THE BRIMS AND SHAPING THE CROWNS OF HATS.

No. 465,129. Patented Dec. 15, 1891.

WITNESSES:

INVENTOR
F. D. Fry
BY
ATTORNEY

UNITED STATES PATENT OFFICE.

FREDERICK D. FRY, OF DANBURY, CONNECTICUT.

MACHINE FOR PRESSING THE BRIMS AND SHAPING THE CROWNS OF HATS.

SPECIFICATION forming part of Letters Patent No. 465,129, dated December 15, 1891.

Application filed July 15, 1891. Serial No. 399,621. (No model.)

*To all whom it may concern:*

Be it known that I, FREDERICK D. FRY, a citizen of the United States, residing at Danbury, in the county of Fairfield and State of Connecticut, have invented certain new and useful Improvements in Apparatus for Banding and Pressing the Brims and Shaping the Crowns of Hats; and I do hereby declare the following to be a full, clear, and exact description of the invention, such as will enable others skilled in the art to which it appertains to make and use the same.

My invention relates to certain new and useful improvements in apparatus for pressing the brims of hats and shaping the crowns thereof, and has for its object to prevent the distortion and crawling of the hat on the block during the process of shaping, and, furthermore, to quickly and effectually produce the result aimed at.

With these ends in view my invention consists in certain details of construction and combination of elements, such as will be fully hereinafter described, and then be specifically designated by the claims.

Figure 1:
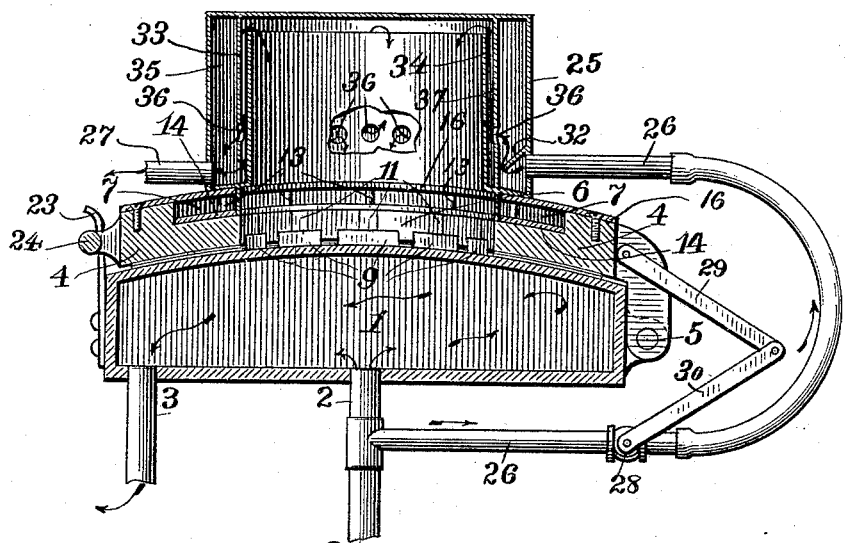
Figure 2:
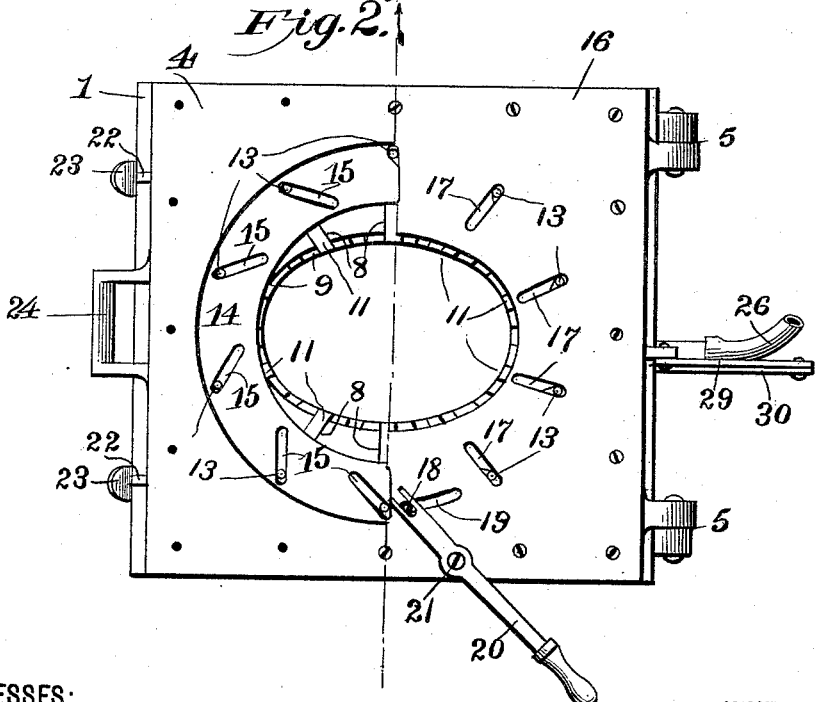
Figure 3:
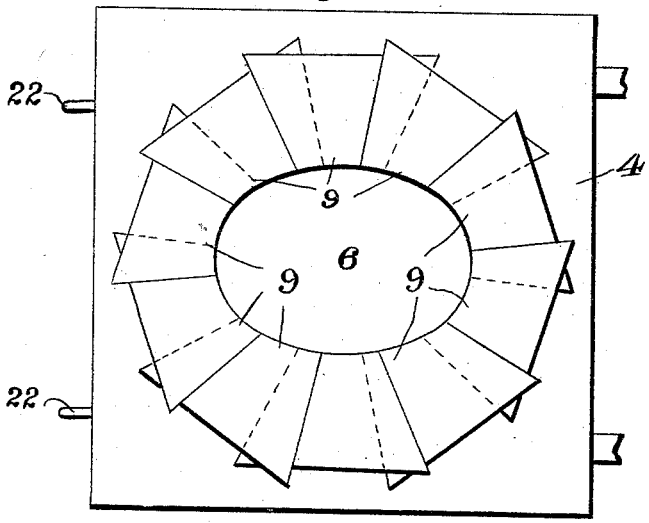
Figure 4:
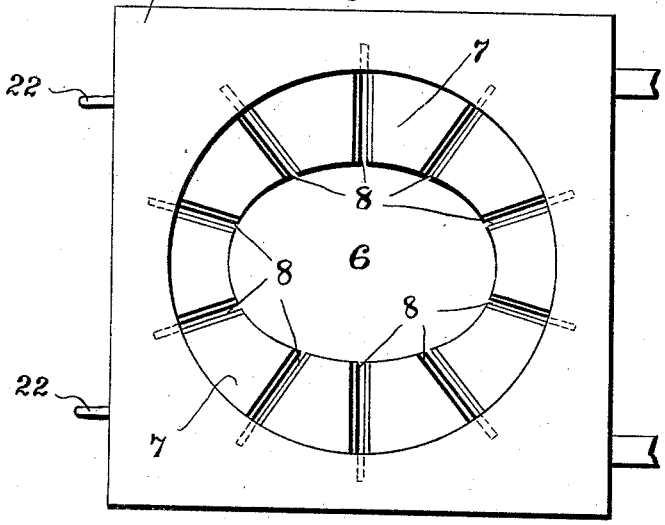
Figure 11:
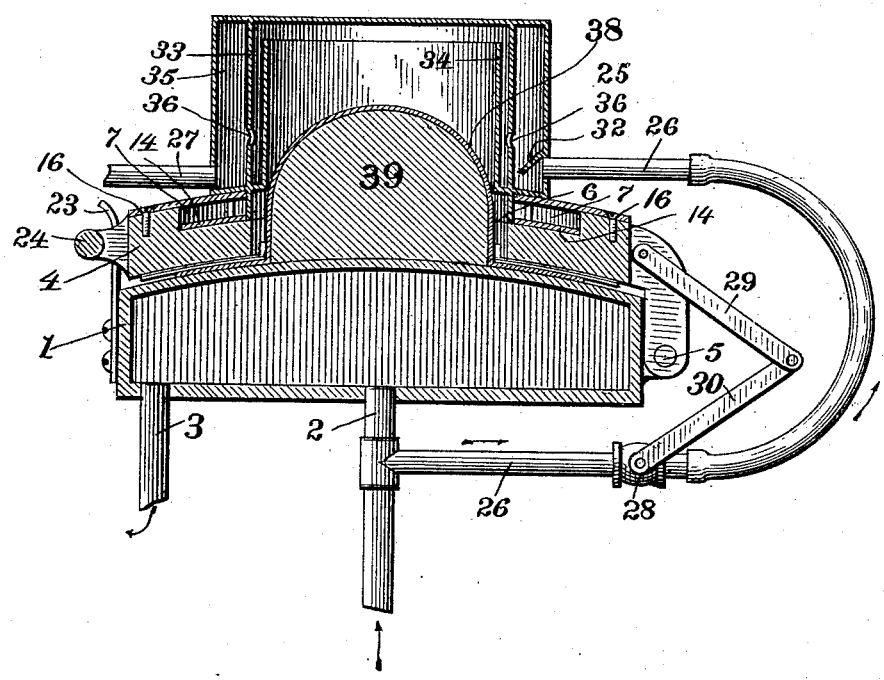

In the accompanying drawings, Figure 1 is a sectional elevation of my improvement; Fig. 2, a plan with the steam-dome removed and the auxiliary guide-plate cut away on a medial line; Fig. 3, a detail bottom view of the brim-presser and showing the clamping-plates in proper assembled position; Fig. 4, a detail plan view of the brim-presser with the parts carried thereby removed. Figs. 5 and 6 are respectively detail top and bottom perspectives of the brim-presser, showing one of the clamping members in proper position therein; Fig. 7, a detail perspective of one of the clamping members. Figs. 8 and 9 are respectively sections at the lines $x\,x$ and $y\,y$ of Fig. 7; Fig. 10, a detail plan of the cam-plate; and Fig. 11 is a sectional elevation similar to Fig. 1, but showing the hat and hat-block in proper relative position within the apparatus.

Similar numbers of reference denote like parts in the several figures of the drawings.

1 is a steam-chest, which may be supported upon any suitable bed. (Not shown.)

2 is a steam-inlet pipe leading into said chest, and 3 is the steam-exhaust pipe.

4 is the brim-presser distensibly attached to the chest, as by hinges 5, and having a central opening 6 of a general ovoidal shape.

7 is an annular recess within the presser 4 and surrounding the opening 6, as clearly shown at Figs. 4 and 5.

8 are radial ways cut within the presser from the wall of the opening 6 back to the wall of the recess 7. These ways are adapted for an ordinary T-slide and extend clear through the presser from the upper to the lower face thereof.

9 are clamping-fingers of any suitable shape and having rigid therewith feathers 10 and head-blocks 11, which latter are above the former and overhang laterally, as shown particularly in Fig. 9, so as to form a T in cross-section, which is adapted to the ways 8. These fingers extend beneath the lower face of the presser 4, and to the bottom of said fingers are secured plates 12, whose lateral adjacent edges are conversely beveled, so as to overlap each other, as shown in Figs. 7 and 3. This beveling of the plates 12 and the consequent overlapping of such beveled edges cause the bottoms of such plates to present a smooth unbroken surface, which will not mark the hat-brim when the presser is down. These feathers 10, blocks 11, fingers 9, and plates 12 are all rigid together, as if cast or otherwise formed from a single piece of metal.

13 are pins which project upward from the blocks 11.

14 is an annular cam-plate having cam-slots 15, which is placed within the recess 7, the pins 13, projecting through said slots, as shown at Figs. 2 and 10. This cam-plate is capable of a free rotatory movement within the recess 7 and the slots 15 extend athwart the ways 8, and it will be readily understood that such rotatory movement will cause the cam-slots to operate on the pins 13 to advance or retract the clamping-fingers, as the case may be.

16 is an auxiliary guide-plate secured to the top of the presser and having radial slots 17 coinciding with the ways 8. The pins 13 project within said slots 17, and an additional means is thereby afforded for steadying the movements of the clamping-fingers and relieving the pins from lateral strain caused by the action of the cam-plate.

18 is a pin projecting upward from the cam-plate through a slot 19 in the plate 16, and 20 is a hand-lever pivoted at 21 to the plate 16 and loosely connected, in the usual and ordinary manner in such instances, to said pin. The movement of said lever to and fro will shift the cam-plate in opposite directions, and thereby effect the operation of the clamping-fingers.

22 are studs extending laterally from the edge of the presser, and 23 are spring-latches secured to the edge of the chest 1, adapted to be forced over said studs to secure the presser in closed position.

The construction of the locking device is immaterial, and, in fact, in certain instances such device is superfluous.

24 is any suitable handle extending from the presser, whereby the latter may be readily raised and lowered.

25 is a steam-drum secured upon the upper face of the presser, 26 the steam-inlet to said drum, and 27 the exhaust. The inlet-pipe 26 leads from the pipe 2, and is provided with an ordinary valve 28, operated by the levers 29 30, pivoted, respectively, to the presser and valve-stem, the inner ends of said levers being pivoted together.

When the presser is in the position shown at Fig. 1, the valve is closed; but when the presser is thrown back on its hinges the levers will operate to open the valve and admit steam to the drum. A baffle-plate 32 may be located opposite to the inlet-pipe 26 in the drum to prevent the condensation of steam to any great degree. This drum has two annular partitions 33 34, the partition 33 forming an outer steam-space 35, while the partition 34 does not extend to the top of the drum. The partition 33 is pierced, as seen at 36, to admit the steam within the space 37 between the two partitions, the latter being so close together that about all the condensation of steam will take place within said space, so that live steam only will be introduced within the interior of the drum.

The operation of my improvement is as follows: The presser is thrown back and a hat 38, with a block 39 interior thereof, introduced from the bottom of said presser through the opening 6 within the interior of the steam-drum. The lever 20 is now operated to cause the fingers 9 to clamp the hat-crown. The live steam will soften the crown of the hat so that it will readily conform to the shape of the block when the latter is finally forced to its limit within the crown. The presser is now closed, as shown at Fig. 1, and secured by the latches 23 and studs 22. The brim of the hat will rest upon the steam-chest 1, while the plates 12 will be depressed upon said brim. These plates, overlapping, as they do, with close joints, prevent the steam from attacking the brim, while the clamping devices hold the base of the crown firmly, whereby the hat is "banded" with great nicety. The hat is "set" in its shape in a few minutes, whereupon the presser is thrown back, the clamping-fingers retracted, and the block and hat removed. By clamping the hat-crown cicumferentially it is impossible for the brim to be distorted or to "crawl" upward during the shaping of the crown, and, moreover, the latter may be clamped in various planes up to about half-way of its height, as well as at the base, thereby effecting a more perfect and rapid conformation of the crown to the block than can possibly be obtained by the use of machines of this description which clamp the brim of the hat preparatory to the shaping of the crown; also, by clamping the crown of the hat, as shown, no steam can be admitted to the brim of the hat and the stretching and shaping will be effected on the crown above the brim, which is a feature of vital importance, since if the brim were softened by the steam it would certainly be stretched by the action of the presser and the hat could not be properly banded.

I do not wish to be limited to the devices shown and described for operating the clamping-fingers; nor, in fact, do I wish to be limited to the latter as specific devices.

I claim—

1. In an apparatus for bending and pressing the brims and shaping the crowns of hats, the combination of the steam-chest, a brim-presser separably attached thereto and having an opening to admit the hat-crown, the block within the said crown, a steam-drum above the opening in the brim-presser, a series of radially-operating clamps carried by the said presser, means adapted to move the clamps inwardly to engage the hat-crown, and plates carried by the clamps and bearing uniformly and continuously upon the brim of the hat, substantially as described.

2. The combination of the presser, the steam-chest, the steam-drum, the radially-movable clamping-fingers guided within and carried by the presser, and the plates secured on the bottoms of said fingers and having their adjacent edges conversely beveled and adapted to overlap each other, whereby said plates present an unbroken surface and prevent the admission of steam to the brim, substantially as set forth.

3. The combination, with the presser having a central opening adapted to receive the hat-crown, of the steam-drum having two partitions, the outer of which is perforated to admit steam in the space between them, while the inner does not extend to the top of the drum, the interior of the latter leading into said opening, substantially as shown and described.

In testimony whereof I affix my signature in presence of two witnesses.

FREDERICK D. FRY.

Witnesses:
J. S. FINCH,
F. W. SMITH, Jr.